No. 105,511. PATENTED JULY 19, 1870.

J. W. STOCKWELL.
PREPARATION OF CEMENT FOR THE MANUFACTURE OF CEMENT PIPE.

Witnesses
Henry C. Houston
Wm. Franklin Leavey

Inventor
J. W. Stockwell
Per Wm. H. Clifford atty

UNITED STATES PATENT OFFICE.

JOHN W. STOCKWELL, OF PORTLAND, MAINE.

IMPROVEMENT IN THE PREPARATION OF CEMENT FOR THE MANUFACTURE OF CEMENT PIPE.

Specification forming part of Letters Patent No. 105,511, dated July 19, 1870.

*To all whom it may concern:*

Be it known that I, JOHN W. STOCKWELL, of Portland, in the county of Cumberland and State of Maine, have invented a new and useful Improved Device for the Preparation of Cement for the Manufacture of Cement Piping; and I do hereby declare the following to be a full, clear, and exact description thereof, which will enable others to make and use my invention, reference being had to the accompanying drawing, forming part of this specification, in which—

Figure 1:
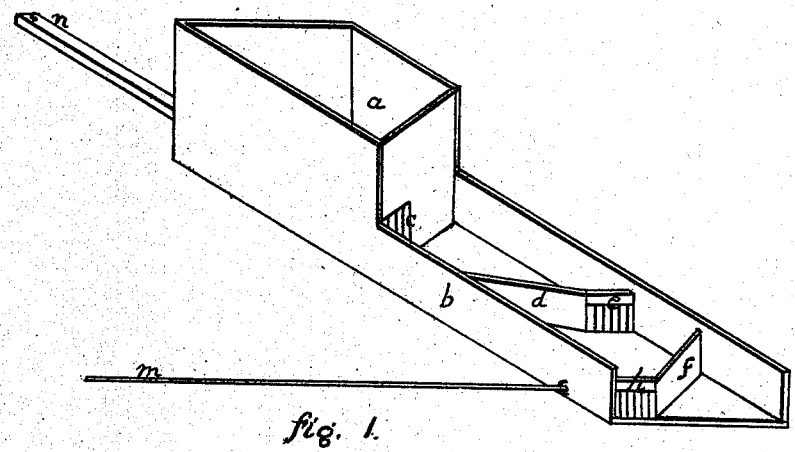
Figure 3:
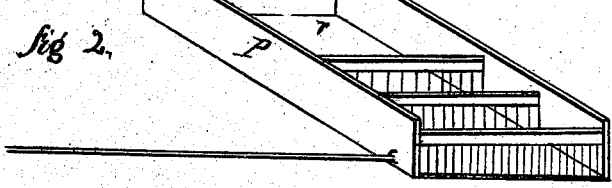
Figure 2:

Figure 1 shows a perspective view of my improved device for mixing the dry cement and sand or gravel; Fig. 2, the same of the device for further mixing the sand and cement, when water is applied to prepare the compound for the manufacture of the pipe. Fig. 3 is a view of an additional set of mixers or screens, which may be used in connection with Fig. 2 when deemed desirable.

In the manufacture of cement piping certain difficulties have been experienced both in the preparation and the manipulation of the composition from which the pipes are made.

The mixing of the sand and cement has heretofore been done in a very rude and imperfect way by means of hoes and shovels, the two component parts being merely heaped together on the floor of the manufactory. This method, as can be easily seen, could not insure a uniform commingling throughout the whole mass; besides, it was a slow process. I effect this mixing by means of the device seen in Fig. 1, which consists of the receptacle *a*, into which is placed, in the proportions customarily used, the sand and cement.

From the receptacle *a* extends the trough or channel *b*, open at the lower end. The whole device *a b* is placed in an inclined position, the mouth or open end of *b* being lower down than the receptacle *a*.

In the lower end of the receptacle *a*, in one corner, at the bottom, is an opening, *c*, in which are placed the vertical rods shown in the drawing, Fig. 1. Then, at a certain distance down the channel *b*, is seen the diagonal partition *d*, with the mixing-gate *e*, similar in construction to *c*. Then, next is seen the diagonal partition *f*, with its mixing-gate *h*.

It will be observed that *f* and *d* are not parallel, but are made on opposite diagonals, so that if extended they would meet.

The whole device thus constructed is suspended from the arms *m n*. *n* is rigidly fastened to the upper and higher end of the device, and has a hole at its other end to receive a pin to be entered at some fixed point, but is designed to allow a lateral motion of the mixer *a b*. The lateral motion is occasioned by the arm *m* being connected at a convenient point with a crank-shaft, which has a fast and loose pulley for convenience in stopping and recommencing the motion of the shaft. Thus the mixer has a lateral reciprocating motion on the bolt or pin in the end of *n*.

Now, the sand and cement are placed in the receptacle *a*, and the motion commenced, and it will be seen that they pass together through *c*, down the inclination on the upper side of *d*, down the trough till they strike *e*, through which they pass, and then down the incline above *f*, and finally through *h*, being subjected all the time to the lateral shaking motion of the trough, and more particularly influenced by it when passing through the mixing-gates *c e h*. Thus the sand and cement become thoroughly and uniformly commingled, and this without any more labor than the depositing of them in *a*.

In Fig. 2 is shown the next mixer for the wetted material after having passed through Fig. 1. This trough *p* is operated similarly to *b*, as will be seen from the drawing; but the construction differs from *b* in that it has railings or gates extending across it at right angles to the sides. The substance to be operated would not pass through the other device readily after having been wetted, as the cement "sets" or hardens so rapidly after being moistened, and, beside, the substance does not now need such an operation. Being placed in *r*, and wet or moistened by any convenient device while therein, it passes down the trough *p*, which is also inclined like *a b*. In this mixer the spaces between the vertical rods grow narrower as they approach the mouth or open end. By this arrangement the wetted cement is fully broken up and the lumps destroyed, and it is left in a soft, fine, and light condition, fitted for the manufacture of the pipe.

Fig. 3 is an arrangement for increasing the mixing gates or screens in Fig. 2, and thus insuring a more perfect union and intermixture of the material, and a more thorough and entire breaking up and reducing thereof. It also serves to prevent the material from fouling or collecting around the rods, so as to prevent the passage through them of other bodies thereof. It consists in an arrangement of gates similar to those in Fig. 2, but connected together, and so placed that each of these gates bears against the upper side of one of the gates in Fig. 2 in the direction of the length thereof. Then, by means of an arm or standard rising from the center of the connecting-bar of these additional gates and rigidly fixed into a beam above, or in any convenient manner, these gates are held firmly in one position, while the mixer and its gates are moved laterally, as above described. This creates a rubbing operation of the two sets of gates, which, it will be seen, serves to accomplish the desired objects. These additional gates are removable at pleasure.

It is evident that more or less of the diagonal partitions shown in Fig. 1 may be employed, as may be desired.

What I claim as my invention, and desire to secure by Letters Patent, is—

1. The mixer shown in Fig. 1, with its receptacle $a$, divisions $d$ $f$, and mixing-gates $c$ $e$ $h$, the whole to be operated as herein described.

2. The device seen in Fig. 2, with its graduated partitions, both fixed and removable, and to be operated as herein described.

JOHN W. STOCKWELL.

Witnesses:
WM. HENRY CLIFFORD,
HENRY C. HOUSTON.